Patented July 1, 1924.

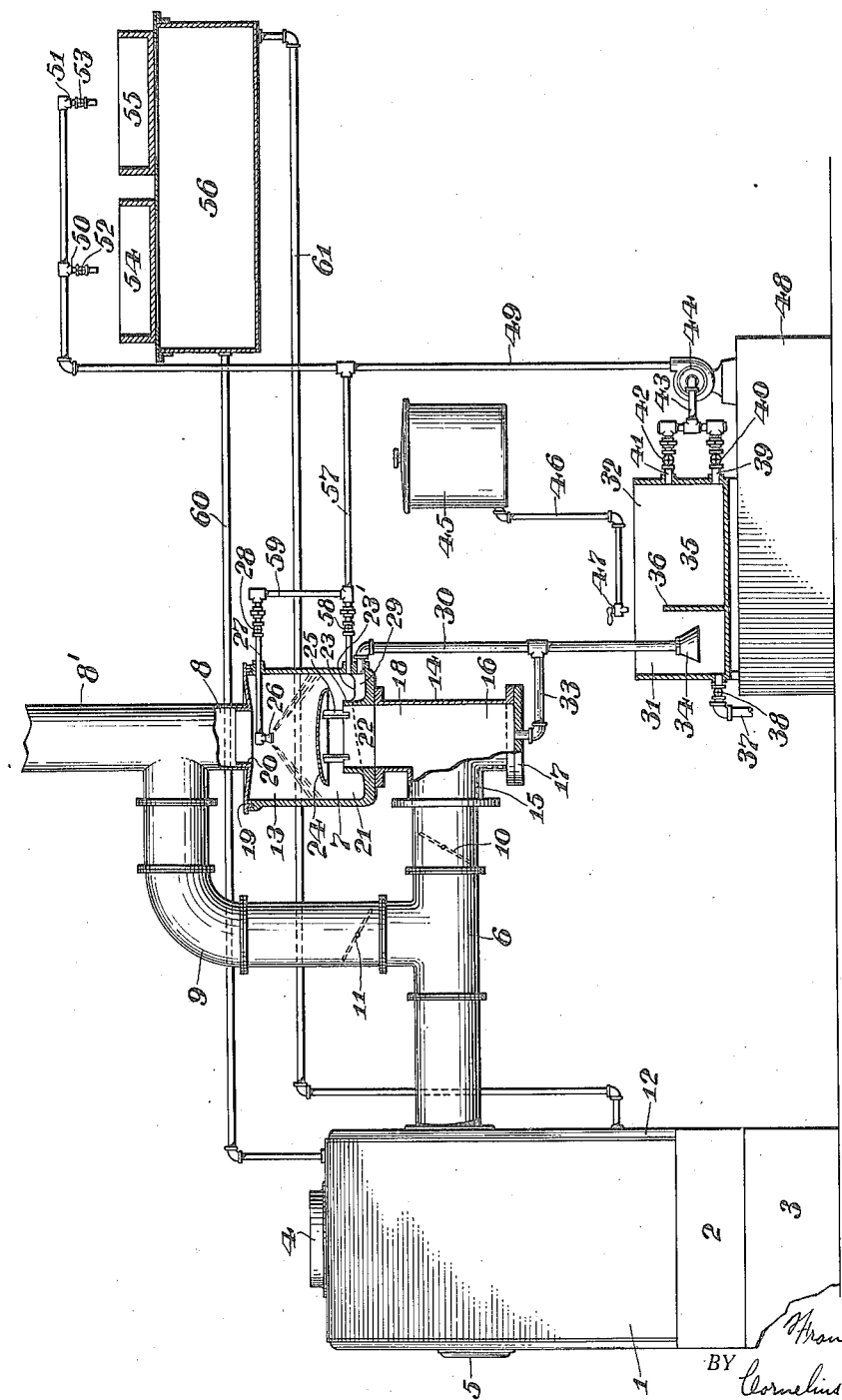

1,499,626

UNITED STATES PATENT OFFICE.

FRANK N. MOERK, OF PHILADELPHIA, PENNSYLVANIA, ASSIGNOR OF ONE-HALF TO CLARENCE P. LANDRETH, OF PHILADELPHIA, PENNSYLVANIA.

METHOD OF AND APPARATUS FOR TREATING NITROGENOUS WASTE MATERIALS.

Application filed March 25, 1920. Serial No. 368,602.

*To all whom it may concern:*

Be it known that I, FRANK N. MOERK, a citizen of the United States, residing in the city and county of Philadelphia, State of Pennsylvania, have invented a new and useful Method of and Apparatus for Treating Nitrogenous Waste Materials, of which the following is a specification.

My invention relates to an apparatus and process for recovering products, particularly ammonia, from sewage sludge, sewage screenings, garbage, tannery waste, slaughter house waste, and similar materials, and in general nitrogenous waste material.

In the treatment of sewage by many of the methods now in use, a sludge or screenings, or both, containing large amounts of waste animal and vegetable matter, is produced. These materials must be disposed of and rendered harmless. Garbage, tannery waste and slaughter house waste are similar materials, and their disposal presents a similar problem.

Several methods are at present employed for disposing of these waste materials. One method is to carry them out to sea. Another is to cook the materials and recover grease and fats therefrom, the solid materials separated from grease being treated in various ways, for instance, they may be dried and used as fertilizer. Another method commonly employed is to burn or incinerate the waste material, in which case the ash may be used as fertilizer. It is with this last method that my invention is concerned. When sewage sludge, screenings, garbage, tannery waste, slaughter house waste, and in general nitrogenous waste material, is incinerated or burned, large quantities of gases are produced. These gases have an objectionable odor and contain materials, including smoke, which are objectionable to animals and vegetation if allowed to escape into the atmosphere. The gases, moreover, contain valuable materials, such as ammonia.

An object of my invention is to provide an apparatus and method for incinerating nitrogenous waste material of the character referred to in which the gases before passing to the atmosphere, are freed of their objectionable properties.

A further and principal object of my invention is to recover from the gases and vapors produced in incinerating sewage sludge, and like materials, products which will in part or entirely pay for the disposal process.

A further object of my invention is to recover from the gases produced in incinerating nitrogenous waste material, a product which may be added to the ash to increase its value as a fertilizer.

For an illustration of one of the many forms in which my apparatus may be embodied, and an understanding of a typical method of carrying out my process, reference is to be had to the accompanying drawing, in which:

The figure is a vertical elevation, parts being in section, of a plant for incinerating sewage sludge and the like and recovering ammonia from the gases.

In the drawing, 1 is an incinerator with an ash pit 2, resting upon foundation 3. At the top of the incinerator is a charging hopper 4, and in the side wall is an opening provided with a door 5 for access to the inside of the incinerator. Flue 6 leads from the incinerator to the scrubbing tower 7. From the top of the scrubbing tower, flue 8 leads to a stack 8'. A flue by-pass 9 leads from flue 6 to flue 8. Flues 6 and 9 are controlled by valves or dampers 10 and 11.

Incinerator 1 is provided with a water jacket 12, which serves to cool and preserve the walls of the incinerator, and furnishes hot water for purposes of evaporating, as hereinafter described. Scrubbing tower 7 may be of any suitable construction for bringing the gases from the incinerator into intimate contact with an absorption material. The form shown is found suitable for this purpose, and comprises an upper absorption chamber 13 and a lower condensation chamber 14 of smaller diameter. Lower chamber 14 is in the form of a T having one arm 15 connected to flue 6. Downwardly extending arm 16 is closed by a cover 17. Upwardly extending arm 18 is open and connects with the upper chamber 13. The chamber 13 is cylindrical and is provided with a cover 19 having a central opening provided with flange 20, which fits into flue 8. The lower end of the chamber 13 is turned inwardly and upwardly, forming an annular channel 21 surrounding the central opening 22, which joins arm 18 of chamber 14. The inner wall of channel 21 is the flange 23, which flange is also the wall of opening 22. Above opening 22 and spaced from flange 23 and the walls of chamber 13 is the baffle or shield 24 overhanging the flange 23. Baffle 24 is suitably supported, for instance, by means of legs 25 resting on flange 23.

In chamber 13, above baffle 24 and below opening 20, is the jet or spray nozzle 26, of any suitable type, for spraying, scrubbing or absorbing agent into contact with gases or vapors passing through chamber 13. Nozzle 26 is supplied with absorbing agent through pipe 27 controlled by valve 28, as hereinafter described. Channel 21 is in the form of a helix, sloping downwardly from the highest point at 23' to the lowest point at 29 from which charged liquor flows through pipe 30 to sludge chamber 31.

Plate 17 on the lower end 16 of chamber 14 is provided with an opening in which is connected a drain pipe 33 leading to pipe 30. The delivery end of pipe 30 is provided with an enlarged funnel-shaped end 34 to deliver liquid into sludge chamber 31 without agitation of the contents thereof.

Sludge chamber 31 comprises a part of container 32 on a foundation or base 48, the other part being a chamber for clear separated liquid 35. Sludge chamber 31 and chamber 35 are separated by wall 36 extending from the bottom of container 32 to a level below the top of the walls thereof. Sludge chamber 31 is provided at or near its bottom with a sludge draw-off pipe 37, controlled by valve 38. Chamber 35 is provided at or near its bottom with pipe 39 controlled by valve 40 and near its top with pipe 41 controlled by valve 42. Pipes 41 and 39 connect through pipe 43 with the intake of pump 44.

The chemical tank 45 delivers absorption liquid through pipe 46 controlled by valve 47 into sludge chamber 31.

The pump 44 discharges through pipe 49 and pipes 50 and 51 controlled by valves 52 and 53, delivering to crystallizing pans 54 and 55, which pans rest on and are heated by hot water bath 56. The pipe 57, controlled by valve 58, connects the discharge of pump 44 to channel 21. Branch pipe 59 connects the discharge of pump 44 through pipes 49 and 57 with pipe 27 leading to spray nozzle 26.

The water bath 56 is supplied with hot water from jacket 12 of incinerator 1 through pipe 60, connected at or near the top of the jacket, and water from bath 56 is returned to jacket 12 through pipe 61 connected to jacket 12 at or near its bottom.

It is to be understood that in place of water jacket 12 the incinerator may be provided with a heating coil within the incinerating chamber, or water bath 56 may be supplied with hot water from any source other than from the incinerator. It is also to be understood that any suitable heating means may be substituted for water bath 56.

The operation is as follows:

Waste material, such as sewage sludge, screenings, garbage and the like, is charged into incinerator 1 through charging hopper 4, and incinerated in the well known manner. Gases and vapors from the incinerator pass through flue 6 to chamber 14 of scrubbing tower 7. In chamber 14 some dust and condensed liquids separate, collecting in 16 and flowing through pipes 33 and 30 to sludge chamber 31. The gases pass upward from chamber 14 under baffle 28 and come in contact with a spray of sulphuric acid or other absorption liquid from spray head 26, and the soluble constituents, particularly ammonia are absorbed. The purified gases then pass through flue 8 to the stack.

The absorption liquid carrying the absorbed material collects in channel 21 and flows through pipe 30 to sludge chamber 31, where solid materials settle and are drawn off as required through pipe 37. Additional absorption reagent, as sulphuric acid, is added to the absorption liquid in chamber 31 from tank 45 through pipe 46 to maintain the strength or acidity of the liquid. Clear liquid flows from chamber 31 over wall 36 to chamber 35. The liquid then flows through pipe 41 to pump 44 through pipes 49, 57, 59 and 27 to spray head 26, again passing through the scrubbing tower 7 and absorbing further quantities of ammonia. As the process continues, the absorption liquid becomes more and more concentrated and is from time to time drawn from chamber 35 through pipes 39, 49 and 50 to crystallizing pans 54 and 55, where it is evaporated by heat from any suitable source, as from water bath 56, and crystallized. The resulting crystals comprising impure ammonium sulphate, when sulphuric acid is used as the absorption liquid, may be refined, or they may be added directly to the ash from incinerator 1 and the product sold as fertilizer.

Or the concentrated absorption liquid carrying absorbed material may be added directly to the ash from the incinerator. If added while the ash is hot, the heat of the ash evaporates the liquid, producing a dry intimate mixture of ash and absorbed material. The sludge from chamber 31 carries some ammonium salts and may advantageously also be added to the ash from the incinerator.

The channel 21 may from time to time become choked with a sludge of solid material scrubbed from the gases, and whenever this occurs, valves 28, 50 and 51 are closed and valve 58 opened, and liquid is pumped through pipes 49, and 57 into channel 21 to flush out the collected material.

Sulphuric acid, more or less diluted, is preferably employed as the absorption agent. My invention is not, however, limited to the use of sulphuric acid. Many other materials, including the strong mineral acids, capable of absorbing impurities from the waste gases of the incinerator and particularly ammonia, may be employed.

The scrubbing chamber 7 may be made of vitrified material or lead lined, or any other suitable material capable of withstanding the action of acid, and the piping and tanks 45 and 32 and crystallizing pans 54 and 55 and pump 44 may be lead lined or made of materials capable of withstanding the action of acids and other materials to which they are subjected.

The form of apparatus disclosed is merely illustrative, it being understood that many changes and modifications may be made therein within the scope of my invention as defined in the appended claims.

What I claim is:

1. The process of disposing of nitrogenous waste material, which comprises incinerating the material, washing the resulting gases with an absorption liquid, recovering absorbed material from said liquid, and adding said material to the ash resulting from incineration.

2. The process of disposing of sewage sludge, screenings, garbage and like materials, comprising incinerating said materials, scrubbing the resulting gases and vapors, separating sludge from the absorption liquid, and adding said sludge and absorbed material to the ash produced by incineration.

3. The process of disposing of nitrogenous waste material, comprising incinerating said material, scrubbing the resulting gases and vapors with an absorption liquid, and adding the absorbed material to the ash resulting from incineration.

4. Apparatus for recovering ammonia from sewage sludge, screenings, garbage and like materials, comprising an incinerator, a scrubbing tower, a flue connecting said incinerator with said scrubbing tower, a pump supplying scrubbing liquid to said tower, a sludge separating chamber receiving liquid from said tower, a concentrator receiving separated liquid from said sludge separating chamber, and means for returning liquid from said concentrator to said pump.

5. Apparatus for recovering products from nitrogenous waste material comprising an incinerator, a scrubbing tower receiving gases from said incinerator, means for circulating scrubbing liquid through said tower comprising a sludge separating chamber receiving liquid from said tower and provided with a sediment compartment and an over-flow compartment into which liquid may flow from the sediment compartment, and a pump receiving liquid from the over-flow compartment and returning it to said tower.

6. Ammonia recovering apparatus comprising a scrubbing tower, said tower comprising a condensation chamber, and an absorption chamber, means for removing condensate and charged scrubbing liquid from said chambers, means for circulating said condensate and scrubbing liquid through said scrubbing chamber, and means for adding absorption reagent to the circulating condensate and scrubbing liquid.

7. Ammonia recovering apparatus comprising a scrubbing tower, a sludge chamber, crystallizing pans, means for circulating liquid through said tower and said chamber, and means for by-passing liquid from said chamber to said pans.

8. Apparatus for disposing of sewage sludge, screenings, garbage and like materials, comprising an incinerator having a water jacket, a water bath supplied with hot water from said water jacket, crystallizing pans heated by said water bath, means for scrubbing gases from said incinerator with a liquid, and means for delivering said liquid to said crystallizing pans.

9. Apparatus for scrubbing gases comprising a condensation chamber receiving said gases, an absorption chamber receiving gases from said condensation chamber, means for circulating scrubbing liquid through said absorption chamber, and means for flushing said absorption chamber.

10. Apparatus for recovering ammonia from gases comprising a scrubbing tower, means for continuously circulating absorption liquid through said tower, means for adding absorption reagent to said liquid, means for withdrawing a part of said liquid, and crystallizing apparatus receiving the withdrawn liquid.

11. Apparatus for scrubbing gases, comprising an absorption chamber receiving said gases, a helical channel at the bottom of said absorption chamber, means for delivering scrubbing liquid to said absorption chamber, means for withdrawing liquid from the lower end of said helical channel, and means for delivering flushing liquid to the upper end of said helical channel.

12. The process which comprises incinerating nitrogenous material, scrubbing the resulting gases and vapors with an absorption liquid, and bringing the absorbed material into contact with the ash resulting from incineration.

In testimony whereof I have hereunto affixed my signature this 24th day of March, 1920.

FRANK N. MOERK.